US010235770B2

(12) United States Patent
Hoye et al.

(10) Patent No.: US 10,235,770 B2
(45) Date of Patent: *Mar. 19, 2019

(54) POTHOLE DETECTION

(71) Applicant: Lytx, Inc., San Diego, CA (US)

(72) Inventors: Brett Hoye, San Marcos, CA (US); Stephen Krotosky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/451,121

(22) Filed: Mar. 6, 2017

(65) Prior Publication Data

US 2017/0243370 A1 Aug. 24, 2017

Related U.S. Application Data

(63) Continuation of application No. 14/631,708, filed on Feb. 25, 2015, now Pat. No. 9,626,763.

(51) Int. Cl.
| | |
|---|---|
| *G06K 9/00* | (2006.01) |
| *G06T 7/73* | (2017.01) |
| *B60R 1/10* | (2006.01) |
| *B60R 11/04* | (2006.01) |
| *G06K 9/46* | (2006.01) |
| *G06T 7/70* | (2017.01) |
| *H04L 29/08* | (2006.01) |

(52) U.S. Cl.
CPC .................. *G06T 7/73* (2017.01); *B60R 1/10* (2013.01); *B60R 11/04* (2013.01); *G06K 9/4604* (2013.01); *G06T 7/70* (2017.01); *B60R 2300/301* (2013.01); *B60R 2300/8086* (2013.01); *G06T 2207/10016* (2013.01); *G06T 2207/30252* (2013.01); *G06T 2207/30261* (2013.01); *H04L 67/12* (2013.01)

(58) Field of Classification Search
CPC ........... G06K 9/00798; G06K 9/00805; G06K 9/00791; G06K 9/3241; B60W 2420/42; G08G 1/165; G08G 1/0129; G06T 2207/30248

See application file for complete search history.

(56) References Cited

U.S. PATENT DOCUMENTS

| | | | | |
|---|---|---|---|---|
| 9,632,502 | B1 * | 4/2017 | Levinson | G01S 17/875 |
| 9,672,446 | B1 * | 6/2017 | Vallespi-Gonzalez | G06K 9/6267 |
| 9,852,357 | B2 * | 12/2017 | Zhang | G06K 9/00798 |
| 2006/0269105 | A1 | 11/2006 | Langlinais | |

(Continued)

OTHER PUBLICATIONS

Balakuntala et al. "An Intelligent System to Detect, Avoid and Maintain Potholes: A Graph Theoretic Approach". arXiv:1305.5522v3 [cs.AI] Sep. 18, 2013. http://arxiv.org/pdf/1305.5522.pdf.

(Continued)

*Primary Examiner* — Bhavesh M Mehta
*Assistant Examiner* — Ian L Lemieux
(74) *Attorney, Agent, or Firm* — Van Pelt, Yi & James LLP

(57) ABSTRACT

A system for pothole detection comprises an input interface configured to receive sensor data and a pothole detector configured to determine a pothole based at least in part on the sensor data using a model, wherein the model is used to classify sensor data; and store pothole data associated with the pothole, wherein the pothole data comprises a pothole video.

20 Claims, 10 Drawing Sheets

(56) References Cited

U.S. PATENT DOCUMENTS

| | | |
|---|---|---|
| 2008/0042815 A1 | 2/2008 | Breed |
| 2009/0192688 A1 | 7/2009 | Padmanabhan |
| 2009/0271469 A1 | 10/2009 | Benco |
| 2014/0122014 A1 | 5/2014 | Flik |
| 2014/0160295 A1 | 6/2014 | Kyomitsu |
| 2016/0093210 A1 | 3/2016 | Bonhomme |
| 2016/0325753 A1* | 11/2016 | Stein .................... B60W 40/06 |
| 2018/0194286 A1* | 7/2018 | Stein .................... B60W 10/18 |
| 2018/0218596 A1* | 8/2018 | Castelli ................ H04W 76/10 |

OTHER PUBLICATIONS

Brian Heaton. "Boston Testing App for Auto-Detecting Potholes". Wireless (/Wireless). GovTech.com. Feb. 21, 2012. http://www.govtech.com/wireless/Boston-Testing-App-for-Auto-Detecting-Potholes.html.

Eriksson et al. "The pothole patrol: using a mobile sensor network for road surface monitoring." Proceedings of the 6th international conference on Mobile systems, applications, and services. ACM, 2008.

Mednis et al. "Real Time Pothole Detection using Android Smartphones with Accelerometers". MobiSensor 2011, Casa Convalescencia, Barcelona Spain, Jun. 29, 2011. http://ieeexplore.ieee.org/xpl/articleDetails.jsp?arnumber=5982206.

* cited by examiner

POTHOLE DETECTION

CROSS REFERENCE TO OTHER APPLICATIONS

This application is a continuation of U.S. patent application Ser. No. 14/631,708, now U.S. Pat. No. 9,626,763, entitled POTHOLE DETECTION filed Feb. 25, 2015 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an accident. A vehicle event recorder typically includes a set of sensors, e.g., video recorders, audio recorders, accelerometers, gyroscopes, vehicle state sensors, GPS (global positioning system), etc., that report data, which is used to determine the occurrence of an accident.

BRIEF DESCRIPTION OF THE DRAWINGS

Various embodiments of the invention are disclosed in the following detailed description and the accompanying drawings.

DETAILED DESCRIPTION

Figure 1:
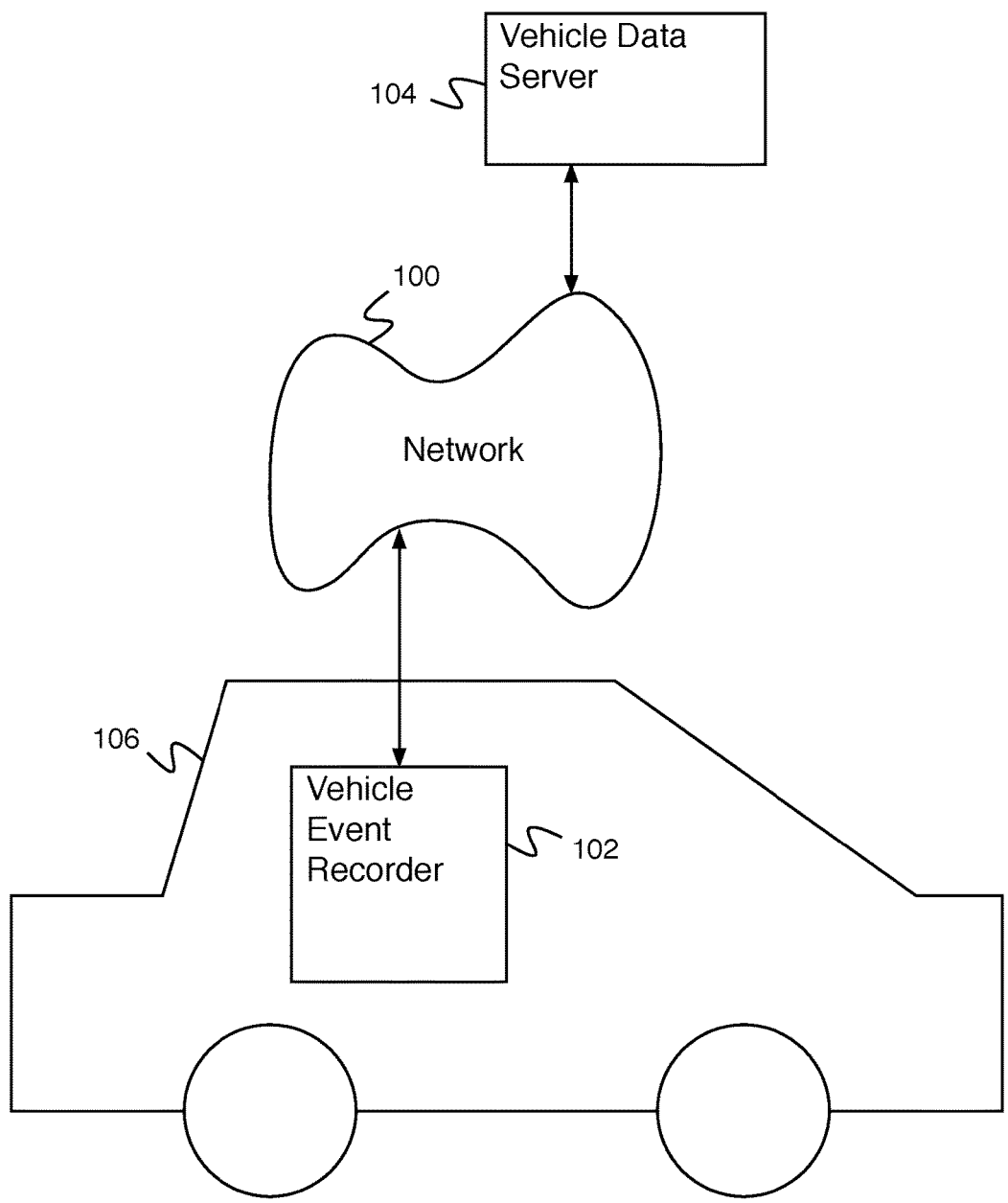
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Pothole detection is disclosed. A system for pothole detection comprises an input interface configured to receive sensor data and a pothole detector configured to determine a pothole based at least in part on the sensor data; and store pothole data associated with the pothole, wherein pothole data comprises a pothole video.

In some embodiments, a system for pothole detection receives sensor data. In various embodiments, sensor data comprises camera data, video recorder data, audio recorder data, accelerometer data, gyroscope data, vehicle state sensor data, GPS data, outdoor temperature sensor data, moisture sensor data, laser line tracker sensor data, or any other appropriate sensor data. In various embodiments, a vehicle state sensor comprises a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensor. In some embodiments, a pothole definition comprises a minimum sensor data threshold and a maximum sensor data threshold (e.g., when the sensor data is measured to record a reading between the minimum sensor data threshold and the maximum sensor data threshold, it is determined that a pothole has been encountered). In various embodiments, a pothole definition depends on a vehicle weight, vehicle type, vehicle speed, or any other appropriate parameter. In the event that a pothole is detected, pothole data is stored. In various embodiments, pothole data comprises a pothole video, location data, vehicle type data, vehicle speed data, pothole classification, pothole severity, pothole visibility, pothole difficulty to avoid, pothole event occurrence rate, or any other appropriate pothole data. In some embodiments, a pothole indication is added to a pothole map. In some embodiments, a pothole indication on a pothole map indicates pothole map related information (e.g., pothole severity, pothole frequency, etc.) via the size of the pothole indication (e.g., a dot size). In some embodiments, in the event an indication is made to a pothole indication on a pothole map, a pothole video is provided. In some embodiments, providing a pothole video comprises selecting a pothole video (e.g., the pothole video with a dramatic video associated pothole severity for the associated location, the pothole video with a dramatic video associated pothole severity for a given vehicle type, a worst video, a video showing a response to a pothole, an interior video, an exterior video, etc.). In some embodiments, pothole data is deleted (e.g., in the event a manual indication of the pothole removal is received, in the event the pothole frequency is equal to zero, etc.).

In some embodiments, a vehicle recorder stores data that is determined by a local processor to be a potential pothole. The potential pothole data is transmitted to a server and further analyzed using a model that determines a likelihood of the potential pothole data being from an actual pothole. In the event that the potential pothole data is likely an actual pothole (e.g., likelihood is greater than a threshold), the potential pothole is confirmed by review of a video. In some embodiments, there is no review to confirm the pothole—the pothole is automatically determined using the likelihood determination. In various embodiments, the pothole determination is checked periodically, randomly, or at any other appropriate interval.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 comprises a pothole detector. In some embodiments, vehicle event recorder 102 includes or is in communication with a set of sensors—for example, cameras, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, event recorder 102 comprises a system for detecting potholes. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global system for mobile communications (GSM) network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location.

Figure 2:
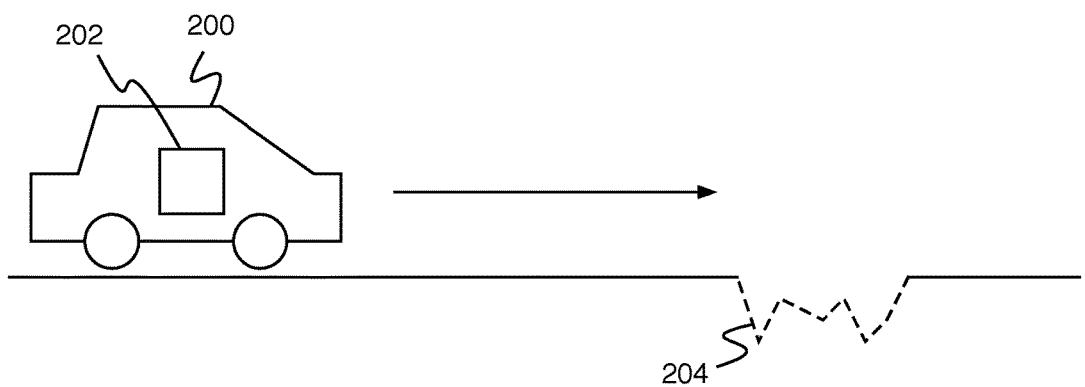
FIG. 2 is a diagram illustrating an embodiment of a pothole.

FIG. 2 is a diagram illustrating an embodiment of a pothole. In some embodiments, vehicle 200 comprises vehicle 106 of FIG. 1. In the example shown, vehicle 200 comprises vehicle event recorder 202. Vehicle event recorder 202 comprises a system for detecting potholes using sensor data. In some embodiments, vehicle event recorder 202 comprises a system for detecting potholes using accelerometer data. Vehicle 200 drives towards the right on the page. When vehicle 200 hits pothole 204, vehicle event recorder 202 records sensor data measured during the collision. In various embodiments, sensor data depends on pothole size, collision angle (e.g., how vehicle 200 hits pothole 204), collision speed, vehicle weight, vehicle type, etc. In some embodiments, vehicle event recorder analyzes sensor data recorded during the collision to determine if the event was a collision with a pothole. In some embodiments, determining if the event was a collision with a pothole comprises determining minimum and maximum thresholds and/or data signature (waveform shape) and comparing a sensor data with the minimum and maximum thresholds and/or data signature (waveform shape). In some embodiments, minimum and maximum thresholds and/or signature (waveform shape) are based at least in part on a vehicle size, a vehicle weight, and/or vehicle type. In some embodiments, when a pothole is determined, pothole data associated with the pothole is stored. In various embodiments, pothole data comprises a pothole video, location data, vehicle type data, vehicle speed data, pothole classification, pothole severity, pothole visibility, pothole difficulty to avoid, a pothole event occurrence rate, or any other appropriate pothole data. In some embodiments, a pothole video comprises a video from a forward facing video camera taken during the period of time when the pothole was hit. In some embodiments, a pothole video comprises a video taken during a period of time when the pothole was visible through the front windshield. In some embodiments, a pothole video comprises a short video. In various embodiments, a short video comprises a video shorter than is taken in the event of a vehicle crash, a video only of the time the pothole was visible, a video less than 1 second long, or any other appropriate short video.

In some embodiments, a video of the interior and/or the video of the forward camera is/are reviewed to confirm whether there is a pothole event and to provide some information (e.g., ability to avoid, impact severity rating to the driver, etc.). In some embodiments, the video review is not required to confirm whether there is a pothole event.

Figure 3:
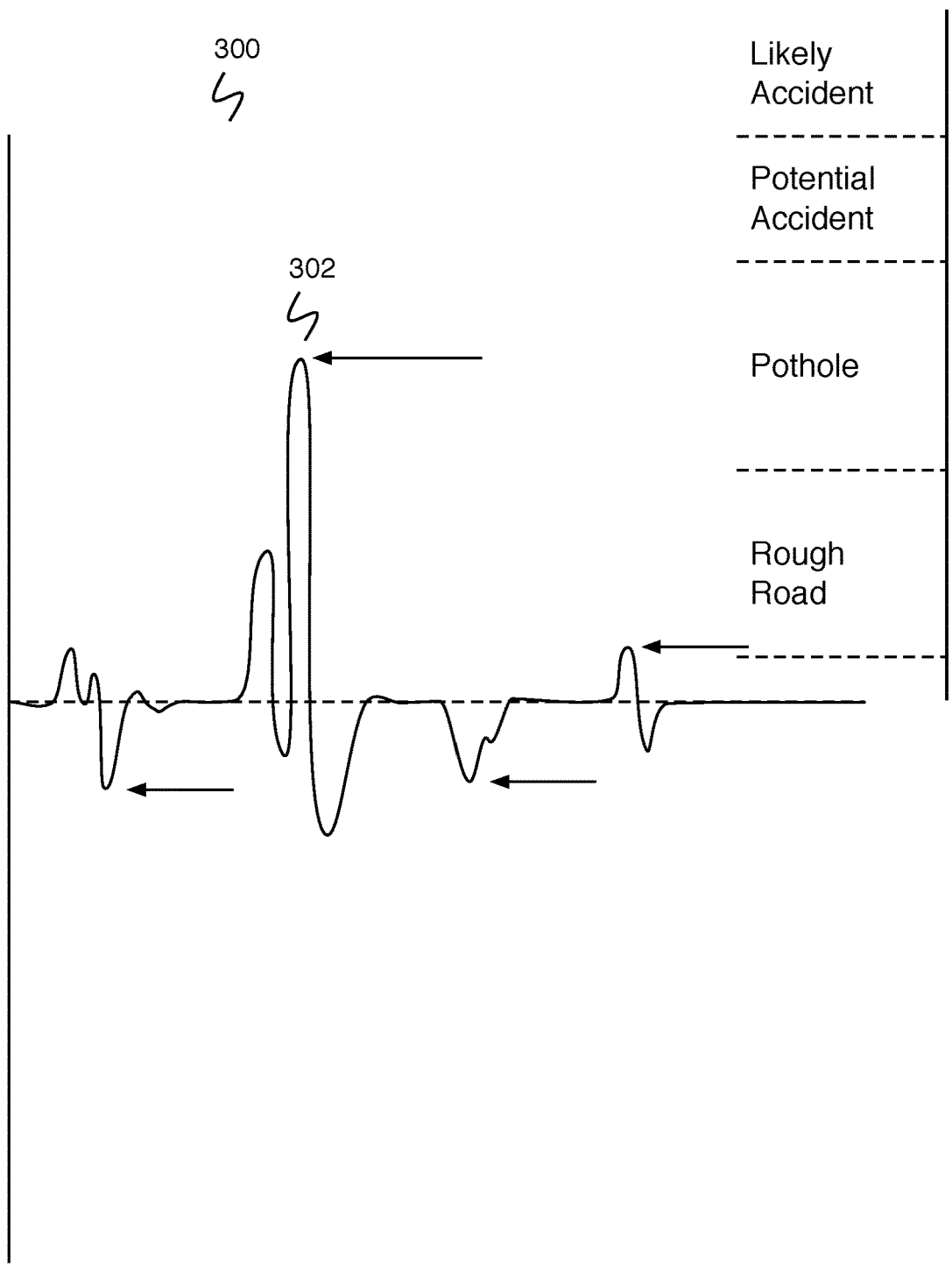
FIG. 3 is a diagram illustrating an embodiment of sensor data.

FIG. 3 is a diagram illustrating an embodiment of sensor data. In some embodiments, sensor data 300 comprises sensor data recorded by a vehicle event recorder. In some embodiments, sensor data 300 comprises accelerometer data. In the example shown, sensor data 300 comprises sensor data measured while a vehicle hits a set of road hazards. A road hazard magnitude is determined for each measured road hazard. In some embodiments, determining a road hazard magnitude comprises separating measured data into individual road hazards (e.g., by identifying regions of sensor data where the absolute value of the sensor data is less than a threshold for greater than a minimum period of time). In some embodiments, determining a road hazard magnitude comprises determining the peak magnitude for the road hazard (e.g., by determining the maximum value of the absolute value of the sensor data of the road hazard). In the example shown, the peak magnitude for four road hazards is shown (e.g., the peaks are identified by arrows). In some embodiments, determining a pothole comprises determining a road hazard with a peak magnitude greater than a minimum pothole threshold and lower than a maximum pothole threshold. In some embodiments, a minimum pothole threshold and a maximum pothole threshold are determined from a pothole definition. In some embodiments, a minimum pothole threshold and a maximum pothole threshold are based at least in part on a vehicle weight, a vehicle speed, and/or vehicle type. In various embodiments, the pothole definition comprises a minimum pothole duration, a maximum pothole duration, a minimum pothole attack rate, a maximum pothole attack rate, a minimum pothole decay rate, a maximum pothole decay rate, an approximate pothole waveform shape, a minimum pothole envelope, a maximum pothole envelope, or any other appropriate pothole definition information. In some embodiments, the pothole duration comprises the time from the road hazard start time to the road hazard stop time. In some embodiments, a pothole attack rate comprises the data slope at the beginning of the road hazard time. In some embodiments, a pothole decay rate comprises the data slope at the end of the road hazard time. In some embodiments, an approximate pothole waveform shape comprises a pothole data shape and a delta value (e.g., an amount by which the pothole data is allowed to differ from the pothole data shape). In some embodiments, a pothole envelope comprises a path tracking the pothole peak value from a pothole start time to a pothole stop time. Peak 302 comprises a pothole (e.g., peak 302 is greater than the minimum pothole threshold and less than the maximum pothole threshold). In some embodiments, a pothole severity is determined from the pothole peak magnitude.

In some embodiments, the data from the available sensors in the system exhibits a specific waveform signature when a pothole is encountered. A collection of example waveforms from pothole and non-pothole events is captured by multiple vehicles equipped with the system in a purely data capture mode. Features are then extracted from the collected data that describe each waveform. In various embodiments, the features include one or more of the following: averages, differences, extremes, peak durations, decay rates, or any other appropriate features. In some embodiments, time-frequency features, such as the short-time Fourier Transform (STFT) or wavelet decomposition coefficients are also used to describe the waveform. These extracted features are used to encode the shape signature of the potholes. The shape signatures extracted from the example events are then used to train a model of the prototypical pothole signature. The learning of the model is done by a machine learning algorithm (e.g., Support Vector Machines (SVM), Neural Networks or other relevant model classification technique). In some embodiments, vehicle weight, type, and/or speed are input to the feature computation or directly into the model to normalize pothole detection robustness across these variables. For example, by incorporating vehicle weight, type, and/or speed, the model adapts to the vehicle weight dependence, vehicle type, and/or speed-dependence of the sensors to the pothole. The trained model is then used to classify subsequent example waveforms. The distance between the trained model and the example is used as a proxy to the likelihood of a pothole event. If this distance is less than a threshold, then the example is identified as a pothole. In some embodiments, environmental data, such as road type categorization, is used to filter pothole detections that likely occurred off-road.

Figure 4:
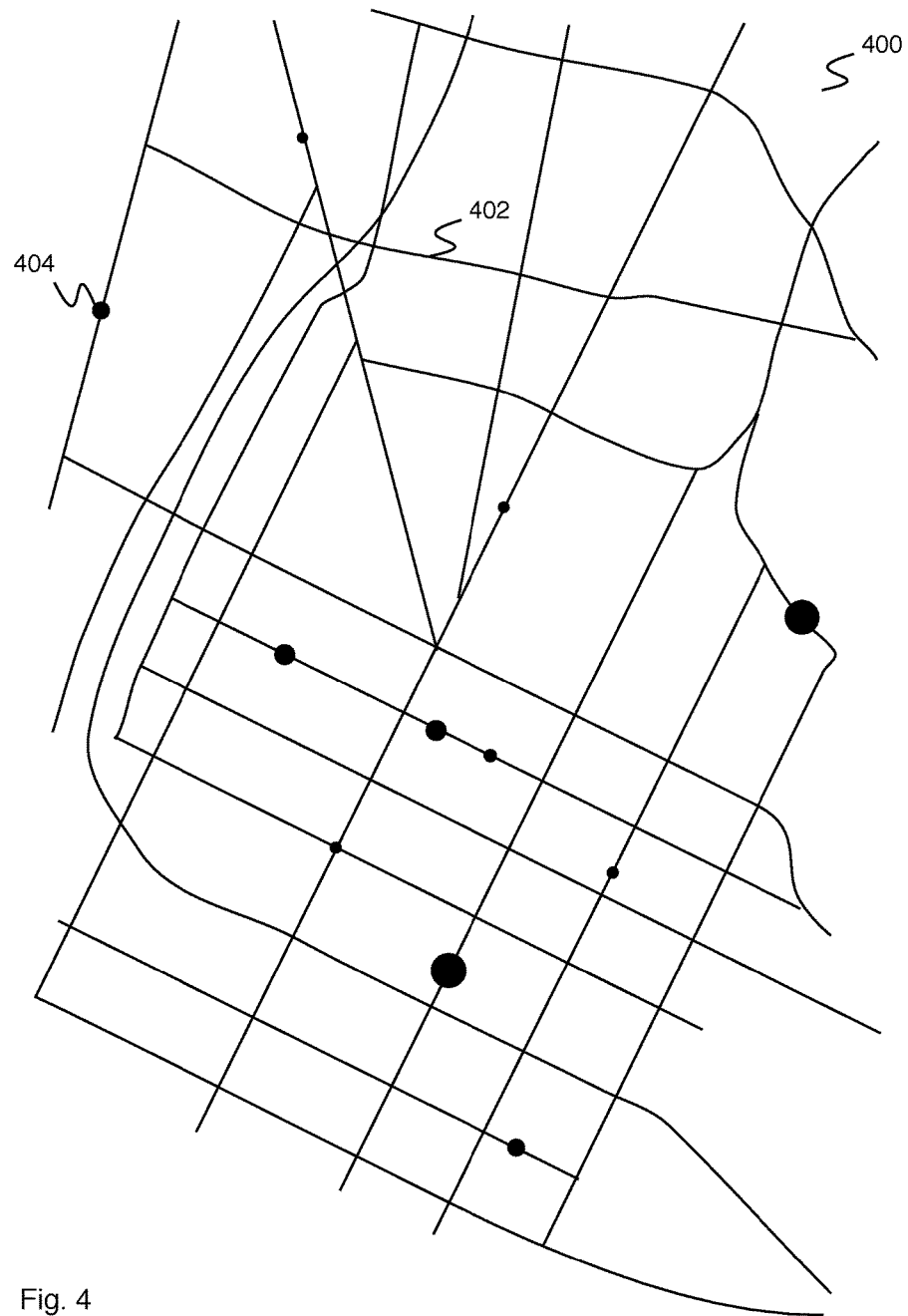
FIG. 4 is a diagram illustrating an embodiment of a pothole map.

FIG. 4 is a diagram illustrating an embodiment of a pothole map. In some embodiments, pothole map 400 comprises a pothole map determined from the pothole measurements of one or more vehicle event recorders (e.g., vehicle event recorder 102 of FIG. 1). In some embodiments, when a pothole is determined by a vehicle event recorder, pothole information is provided to a vehicle data server. The vehicle data server assembles the pothole data into a pothole map for viewing. In the example shown, pothole map 400 comprises roads (e.g., road 402) and pothole indicators (e.g., pothole indicator 404). Pothole indicators comprise marks (e.g., circles) indicating detection of a pothole at the indicated location. In some embodiments, pothole indicators comprise an indicator size (e.g., a small circle, a large circle). In various embodiments, indicator size indicates pothole severity (e.g., the size of the pothole), pothole frequency (e.g., how often the pothole is detected), pothole difficulty to avoid (e.g., the fraction of the routes known to travel past the pothole location where the pothole is detected) or any other appropriate pothole data. In some embodiments, a pothole video is provided in response to an indication (e.g., a click, a touch, etc.) to a pothole indicator. In some embodiments, providing a pothole video comprises selecting a pothole video. In various embodiments, selecting the pothole video comprises selecting the pothole video with a worst, a dramatic, interior, exterior, showing the effect of hitting a pothole video, a video associated with a pothole collision severity, selecting the pothole video with the worst associated pothole collision severity for the location, selecting the pothole video with the worst associated pothole collision severity for a given vehicle type, or selecting the pothole video in any other appropriate way.

Figure 5A:
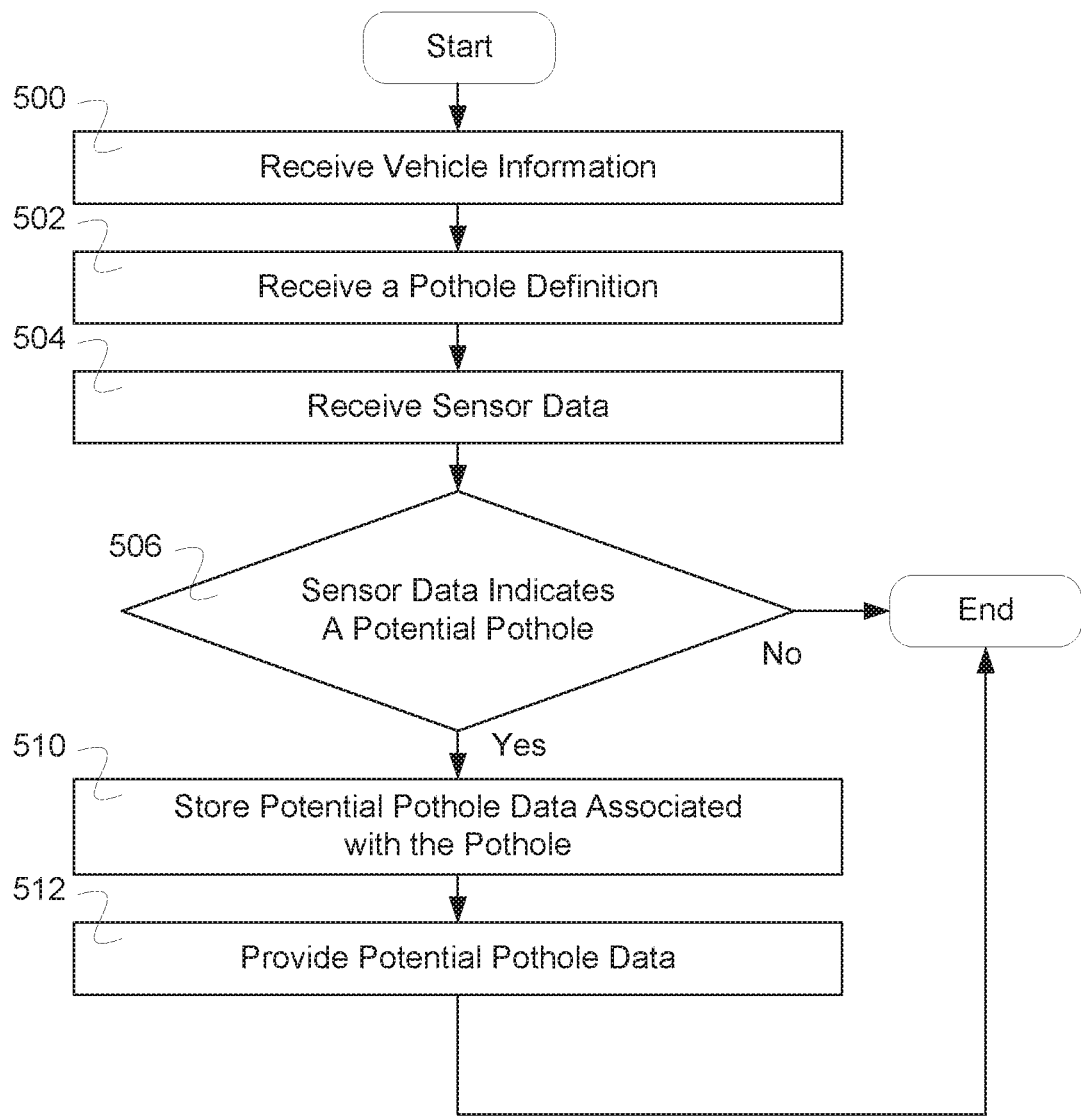
FIG. 5A is a flow diagram illustrating an embodiment of a process for detecting a pothole.

FIG. 5A is a flow diagram illustrating an embodiment of a process for detecting a pothole. In some embodiments, the process of FIG. 5A is executed by a vehicle event recorder (e.g., vehicle event recorder 102 of FIG. 1). In the example shown, in 500, vehicle information is received. In various embodiments, vehicle information comprises a vehicle make, a vehicle model, a vehicle type, a vehicle year, a vehicle weight, a vehicle type, a vehicle engine type, a vehicle shocks type, a vehicle identifier, an event recorder identifier, or any other appropriate vehicle information. In 502, a pothole definition is received. In some embodiments, a pothole definition comprises minimum and maximum pothole sensor data thresholds. In some embodiments, the pothole definition depends on vehicle information. In some embodiments, the pothole definition depends on vehicle speed. In various embodiments, the pothole definition comprises a minimum pothole duration, a maximum pothole duration, a minimum pothole attack rate, a maximum pothole attack rate, a minimum pothole decay rate, a maximum pothole decay rate, an approximate pothole waveform shape, a minimum pothole envelope, a maximum pothole envelope, or any other appropriate pothole definition information. In some embodiments, the pothole definition is stored on the vehicle event recorder. In 504, sensor data is received. In various embodiments, sensor data comprises camera data, video recorder data, audio recorder data, accelerometer data, gyroscope data, vehicle state sensor data, GPS data, outdoor temperature sensor data, moisture sensor data, laser line tracker sensor data, or any other appropriate sensor data. In 506, it is determined whether the sensor data indicates a potential pothole. For example, it is determined whether sensor data indicates a pothole using a pothole definition or signature (e.g., a one or more sensor range conditions and/or threshold conditions that are satisfied—for example, acceleration in the vertical direction exceeds a minimum threshold and/or sudden evasive maneuver with/without braking). In some embodiments, determining whether sensor data indicates a pothole includes storing an indication that a pothole has been detected. In some embodiments, determining a pothole comprises determining pothole data. In various embodiments, pothole data comprises a pothole video, location data, vehicle type data, vehicle speed data, pothole classification, pothole severity, pothole visibility, pothole difficulty to avoid, a pothole event occurrence rate, road conditions, or any other appropriate pothole data. In the event sensor data does not indicate a pothole, the process ends. In the event sensor data indicates a pothole, control passes to 510. In 510, the potential pothole data is stored associated with the pothole. For example, the data is stored using a memory. In 512, the potential pothole data is provided. In some embodiments, the pothole data is provided to a vehicle data server (e.g., vehicle data server 104 of FIG. 1).

Figure 5B:
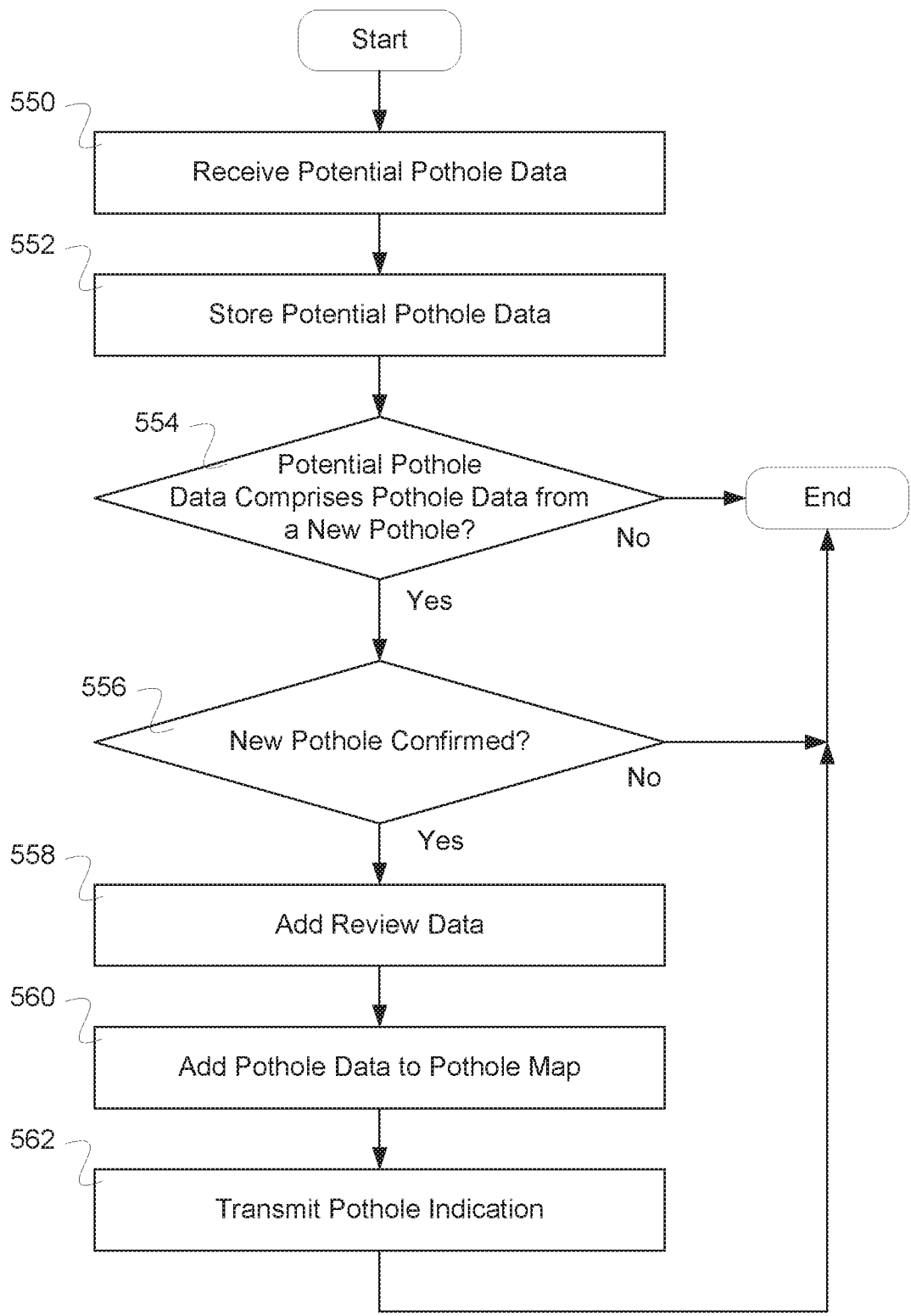
FIG. 5B is a flow diagram illustrating an embodiment of a process for storing pothole data.

FIG. 5B is a flow diagram illustrating an embodiment of a process for storing pothole data. In some embodiments, the process of FIG. 5B is executed in response to receiving pothole data (e.g., pothole data provided by a vehicle event recorder in 512 of FIG. 5A). In some embodiments, the process of FIG. 5B is executed by a vehicle data server (e.g., vehicle data server 104 of FIG. 1). In the example shown, in 550, potential pothole data is received. For example, pothole data (e.g., accelerometer data, interior video data, forward camera video data, audio data, braking data, etc.) is received from a vehicle event recorder. In 552, potential pothole data is stored. For example, the pothole data is stored in a pothole database. In some embodiments, the pothole database is used in conjunction with confirmation data of whether the pothole is actually a pothole or not to train a model or to update training of a model. In 554, it is determined whether the potential pothole data is comprises pothole data from a new pothole (e.g., a pothole that has not been detected before). For example, the pothole data is analyzed using a model to determine the likelihood that the pothole data is caused by an actual pothole. In the event that the pothole data does not comprise pothole data from a new pothole, the process ends. In the event that the pothole data comprises pothole data from a new pothole, in 556 the new pothole is confirmed. For example, a forward video and/or an interior video is/are reviewed to confirm that the pothole data is actually caused by the vehicle hitting an actual pothole. In some embodiments, the confirmation of whether the pothole is or is not a pothole is stored associated with the data in the pothole database so that it can be used to train or update training of the model for detecting automatically a pothole from potential pothole data. In the event that the new pothole is not confirmed, the process ends. In the event that the new pothole is confirmed, in 558 review data is associated with the pothole data. For example, information determined during the review of the interior and/or forward video is associated with the pothole data (e.g., impact to the driver, a severity rating—for example, mild, medium, very harsh, etc., driving avoidability rating—for example, easy to avoid, hard to avoid, etc., visibility rating—for example, easily seen, hard to see, etc.). In 560, pothole data is added to a pothole map. For example, an icon associated with the pothole data is placed on a map. In some embodiments, the icon is modified depending on the data (e.g., the size or color of the icon is related to avaoidability rating, severity rating, visibility rating, date first recorded, etc.) In 562, pothole data is transmitted. In some embodiments, pothole data is transmitted to pothole authorities (e.g., a department of public works, a roads department, etc.).

Figure 6:
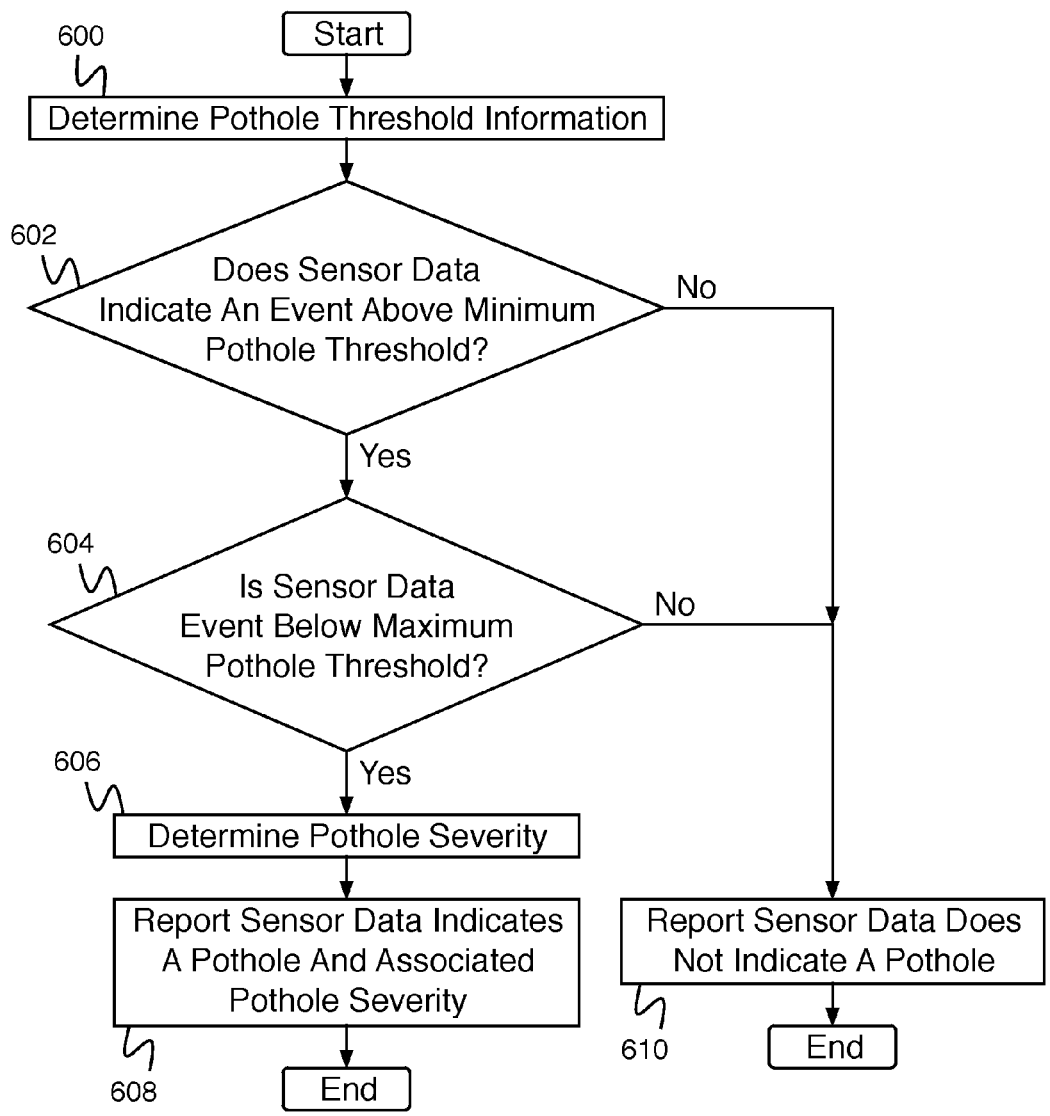
FIG. 6 is a flow diagram illustrating an embodiment of a process for determining whether sensor data indicates a pothole.

FIG. 6 is a flow diagram illustrating an embodiment of a process for determining whether sensor data indicates a pothole. In some embodiments, the process of FIG. 6 implements 506 of FIG. 5. In the example shown, in 600, pothole threshold information is determined. In some embodiments, pothole threshold information is based on a pothole definition. In various embodiments, pothole threshold information is based on a vehicle weight, vehicle type, vehicle speed, or any other appropriate parameter. In some embodiments, pothole threshold information comprises a minimum pothole threshold and a maximum pothole threshold. In 602, it is determined whether sensor data indicates an event above the minimum pothole threshold. In the event sensor data does not indicate an event above the minimum pothole threshold, control passes to 610. In the event sensor data indicates an event above the minimum pothole threshold, control passes to 604. In 604, it is determined whether the sensor data event is below the maximum pothole threshold. In the event that the sensor data event is below the maximum threshold, control passes to 606. In 606, pothole severity is determined. In some embodiments, pothole severity is determined from a pothole peak magnitude. In 608, the process reports that sensor data indicates a pothole and the associated pothole severity. In the event it is determined in 604 that the sensor data event is not below the maximum pothole threshold, control passes to 610. In 610, the process reports that sensor data does not indicate a pothole.

Figure 7:
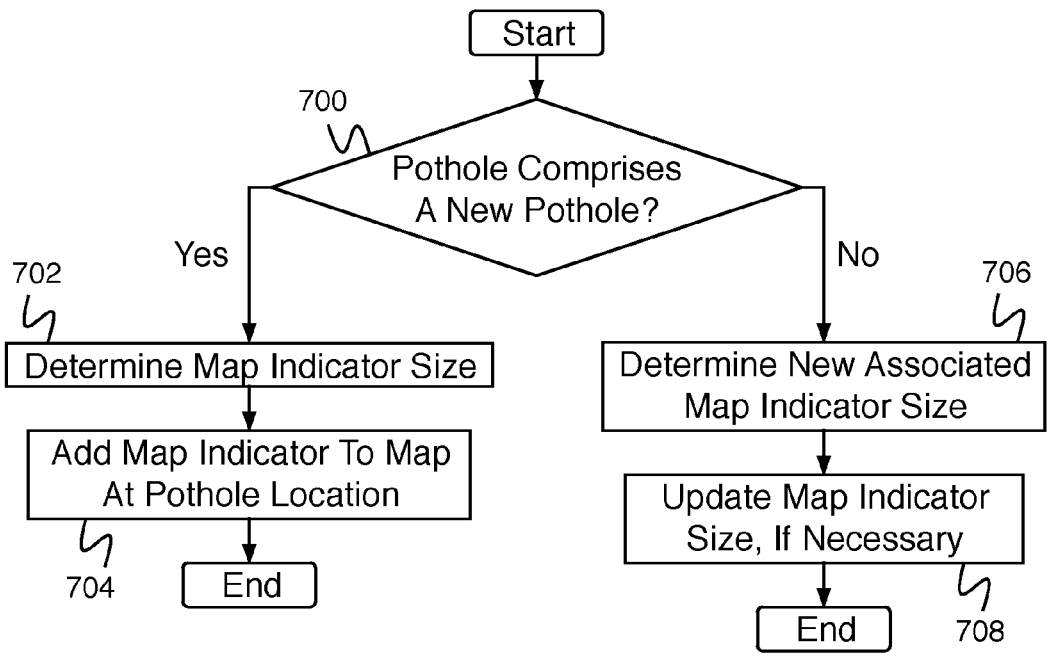
FIG. 7 is a flow diagram illustrating an embodiment of a process for adding pothole data to a pothole map.

FIG. 7 is a flow diagram illustrating an embodiment of a process for adding pothole data to a pothole map. In some embodiments, the process of FIG. 7 implements 554 of FIG. 5B. In the example shown, in 700, it is determined whether the pothole comprises a new pothole (e.g., whether the pothole is not yet on the pothole map). In the event it is determined that the pothole comprises a new pothole, control passes to 702. In 702, the map indicator size is determined. For example, the map indicator size is determined from pothole data or from video review. In various embodiments, indicator size indicates pothole severity (e.g., the size of the pothole), pothole frequency (e.g., how often the pothole is detected), pothole difficulty to avoid (e.g., the fraction of the routes known to travel past the pothole location where the pothole is detected) or any other appropriate pothole data. In 704, the map indicator is added to the map at the pothole location (e.g., the location of the vehicle when the pothole was detected), and the process ends. In the event it is determined in 700 that the pothole does not comprise a new pothole, control passes to 706. In 706, a new associated map indicator size is determined. In some embodiments, a new associated map indicator size is determined by determining a moving average of the pothole data associated with the map indicator size. In some embodiments, a new associated map indicator size is determined by determining a pothole detection frequency. In 708, the map indicator size is updated if necessary. In some embodiments, the map indicator size is not updated in the event that it has not changed in size.

Figure 8:
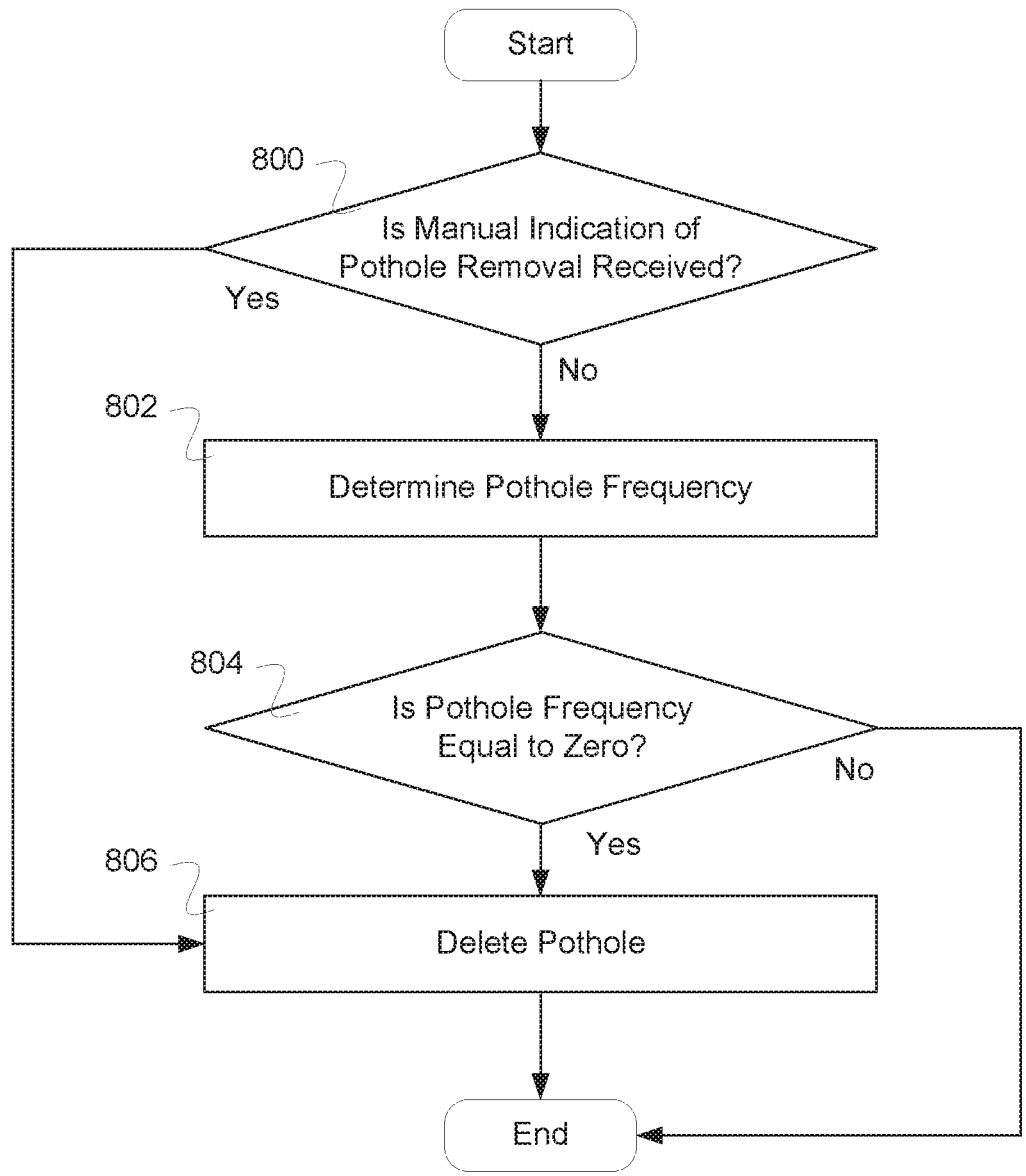
FIG. 8 is a flow diagram illustrating an embodiment of a process for deleting a pothole.

FIG. 8 is a flow diagram illustrating an embodiment of a process for deleting a pothole. In some embodiments, the process of FIG. 8 is executed by a vehicle data server. In some embodiments, the process of FIG. 8 comprises a process for deleting a pothole from a pothole data storage (e.g., a pothole data storage used for storing a pothole in the process of FIG. 5B). In the example shown, in 800, it is determined whether manual indication of a pothole removal was received. For example, an indication is received from a pothole authority and relayed to the system. In the event that it is determined that manual indication of the pothole removal was received, control passes to 810. In the event that it is determined that manual indication of the pothole removal was not received, control passes to 802. In 802, pothole frequency is determined. In some embodiments, pothole frequency comprises a number of times the pothole was detected per time period. In some embodiments, pothole frequency is computed over a predetermined time period (e.g., the previous day, the previous three days, the previous week, the previous month, etc.). In 804, it is determined whether the pothole frequency is equal to zero (e.g., the pothole has been detected no times over the pothole frequency time period—for example, no hit in a month). In the event it is determined that the pothole frequency is not equal to zero, the process ends. In the event it is determined that the pothole frequency is equal to zero, control passes to 806. In 806, the pothole is deleted.

Figure 9:
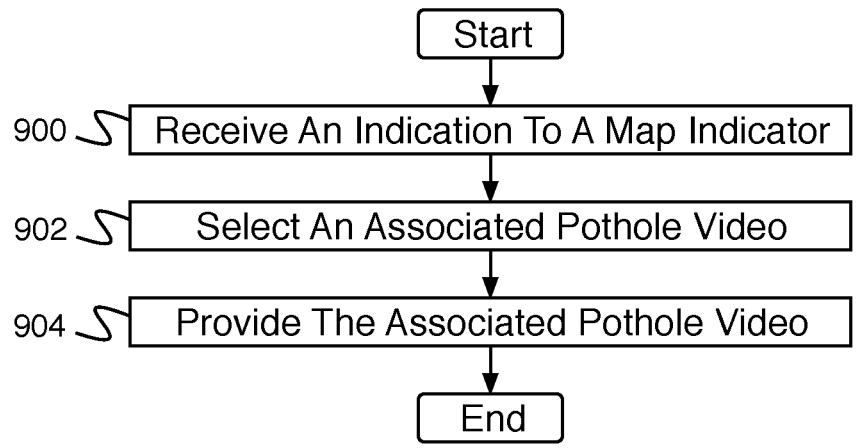
FIG. 9 is a flow diagram illustrating an embodiment of a process for playing a video.

FIG. 9 is a flow diagram illustrating an embodiment of a process for playing a video. In some embodiments, the process of FIG. 9 is executed by a vehicle data server. In the example shown, in 900 an indication (e.g., a click, a tap) is received to a map indicator (e.g., a dot on a pothole map, e.g., pothole map 400 of FIG. 4). In 902, an associated pothole video is selected. In various embodiments, selecting an associated pothole video comprises selecting the pothole video with the worst associated pothole collision severity, selecting the pothole video with the worst associated pothole collision severity for the location, selecting the pothole video with the worst associated pothole collision severity for a given vehicle type, selecting a dramatic video, selecting a video that shows the effect of running over a pothole, or selecting the pothole video in any other appropriate way. In 904, the associated pothole video is provided (e.g., video data is provided for a video display).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for pothole detection, comprising:
    an input interface configured to:
        receive potential pothole data, wherein the potential pothole data is determined by a vehicle event recorder based at least in part on sensor data;
    a pothole detector processor configured to:
        determine whether an actual pothole caused the potential pothole data using a model, wherein the model is used to classify potential pothole data; and
        store the potential pothole data and a determination of whether the actual pothole caused the potential pothole data, wherein the potential pothole data and the determination of whether the actual pothole caused the potential pothole data are used to train the model.

2. The system of claim 1, wherein the potential pothole data comprises a video.

3. The system of claim 1, wherein the potential pothole data comprises one of: location data, vehicle type data, vehicle speed data, pothole classification, pothole severity, pothole visibility, pothole difficulty to avoid, pothole event occurrence rate.

4. The system of claim 1, wherein the pothole detector processor is further configured to provide pothole data.

5. The system of claim 1, wherein a pothole definition depends on a vehicle weight or vehicle type.

6. The system of claim 1, wherein a pothole definition depends on a vehicle speed.

7. The system of claim 1, further comprising a vehicle data server.

8. The system of claim 7, wherein the vehicle data server is configured to receive the potential pothole data from the vehicle event recorder.

9. The system of claim 7, wherein the vehicle data server is configured to transmit pothole data to pothole authorities.

10. The system of claim 7, wherein the vehicle data server is further configured to provide a pothole video for playing.

11. The system of claim 10, wherein providing the pothole video comprises selecting the pothole video.

12. The system of claim 11, wherein selecting the pothole video comprises selecting the pothole video with a dramatic video associated pothole collision severity for a pothole location.

13. The system of claim 11, wherein selecting the pothole video comprises selecting the pothole video with a dramatic video associated pothole collision severity for a given vehicle type.

14. The system of claim 7, wherein the vehicle data server is further configured to delete pothole data.

15. The system of claim 14, wherein the vehicle data server is configured to delete pothole data in the event a pothole frequency is equal to zero.

16. The system of claim 14, wherein the vehicle data server is configured to delete pothole data in the event a manual indication of a pothole removal is received.

17. The system of claim 7, wherein the vehicle data server is further configured to build a pothole map.

18. The system of claim 17, wherein the vehicle data server is further configured to determine whether the actual pothole is a new pothole based at least in part on the pothole map.

19. A method for pothole detection, comprising:
    receiving potential pothole data, wherein the potential pothole data is determined by a vehicle event recorder based at least in part on sensor data;
    determining, using a pothole detector processor, whether an actual pothole caused the potential pothole data using a model, wherein the model is used to classify potential pothole data; and
    storing the potential pothole data and a determination of whether the actual pothole caused the potential pothole data, wherein the potential pothole data and the determination of whether the actual pothole caused the potential pothole data are used to train the model.

20. A computer program product for pothole detection, the computer program product being embodied in a non-transitory computer readable storage medium and comprising computer instructions for:
    receiving potential pothole data, wherein the potential pothole data is determined by a vehicle event recorder based at least in part on sensor data;
    determining, using a pothole detector processor, whether an actual pothole caused the potential pothole data using a model, wherein the model is used to classify potential pothole data; and
    storing the potential pothole data and a determination of whether the actual pothole caused the potential pothole data, wherein the potential pothole data and the determination of whether the actual pothole caused the potential pothole data are used to train the model.

* * * * *